United States Patent [19]
Young

[11] 3,753,675
[45] Aug. 21, 1973

[54] FERTILIZER SOLUTIONS CONTAINING SOLUBLE IRON COMPLEXES

[75] Inventor: Donald C. Young, Fullerton, Calif.

[73] Assignee: Union Oil Company of California, Los Angeles, Calif.

[22] Filed: Apr. 28, 1972

[21] Appl. No.: 247,450

[63] Continuation-in-part of Ser. No. 12,129, Feb. 17, 1970, Pat. No. 3,679,377.

[52] U.S. Cl.................... 71/1, 423/396, 423/545, 423/551

[51] Int. Cl............................................. C05d 9/02

[58] Field of Search.................... 71/1, 59; 423/545, 423/551, 395, 385, 387, 396

[56] References Cited
OTHER PUBLICATIONS

Mellor, Comprehensive Treatise on Inorganic and Theoretical Chemistry, 1927, Vol. 14, pp. 340–346.

*Primary Examiner*—Samih N. Zaharna
*Assistant Examiner*—Richard Barnes
*Attorney*—Milton W. Lee et al.

[57] ABSTRACT

An agronomically effective source of iron is provided in a plant nutrient solution as a soluble diferrate complex anion. The solution is effective for foliar application to plants and is compatible with plant nutrients commonly used for fertilization such as urea, ammonium nitrate and ammonium phosphate. If desired, water soluble salts of other trace metals can be added to the iron solution. Solutions containing the iron complexes have been observed to exhibit a greater agronomical effect on plants than exhibited by use of conventional iron sources such as aqueous solutions of water soluble iron salts or chelates of iron using conventional chelating agents. The solutions are also free of foliage or fruit spotting which frequently occurs with conventional iron sources. In a specific embodiment, a solution is provided which is effective for the foliar fertilization of pineapple and which contains a soluble ferric sulfatohydroxyl complex dissolved in ammonium nitrate or urea.

10 Claims, No Drawings

FERTILIZER SOLUTIONS CONTAINING SOLUBLE IRON COMPLEXES

DESCRIPTION OF THE INVENTION

This application is a continuation-in-part of my copending application, Ser. No. 12,129 filed Feb. 17, 1970 now U.S. Pat. No. 3,679,377.

The invention relates to plant nutrient solutions and, in particular, relates to plant nutrient solutions containing a readily available and highly soluble iron complex.

Iron is a commonly required trace metal for copper plant growth. Although iron salts are abundant in most soils, plants are often unable to utilize the iron, since the soil renders the iron salts water insoluble and unavailable. The deficiencies of iron have been cured somewhat by the application of foliar sprays, however, the limited solubility of iron salts in commonly used plant nutrient solutions such as ammonium nitrate, ammonium sulfate, ammonium phosphate, urea, etc., necessitates that the iron salts be separately applied, thereby increasing the expense of application. In addition, the limited solubility of the iron salts in aqueous sprays often limits the amount of metal that can be absorbed by the plant by transpiration through the cell walls and stomata so that use of the soluble salts is often unsuitable.

Varous iron chelates have been used to obviate the aforementioned difficulties. The chelates are complexes of the metals with certain chelating agents which have two or more sites in their molecules for bonding with the metal and which are capable of forming a closed ring with the metal. In this form, the metals are stabilized and most of the solubility problems are obviated. These chelating agents, however, are relatively complex compounds which are too expensive for large scale agronomical use. In addition, many of the chelates are very stable compounds and the chelate structure hinders the utilization of the metal by the plant after its assimilation. Finally, iron complexes of organic ligands and iron salts when used in foliar sprays often cause objectionable spotting of foliage or crop.

It is an object of this invention to provide a highly soluble form of agronomically effective iron.

It is also an object of this invention to provide agronomically effective iron in a readily available form for plant nutrition and in a form that is not prone to spotting of foliage or crop.

It is likewise an object of this invention to provide complexes of the agronomically effective metals with inexpensive and relatively available reagents.

It is a further object of this invention to provide such complexes as stable solutions with other plant nutrients.

It is also a further object of this invention to provide such complexes using substantially only plant nutrient reagents as complexing agents so that the total plant nutrient content of the solution is not diluted by such agents.

It is also a further object of this invention to provide a simple method for the preparation of such complexes which can use the least expensive or most available source of the agronomically effective iron.

Other and related objects will be apparent from the following description of the invention.

The aforementioned objects are secured by admixing an iron source such as metallic iron or ferrous sulfate or halides with an aqueous solution of from 5 to about 70 weight percent ammonium nitrate having a pH from 1 to about 3 and exposing the resultant mixture to autooxidation conditions comprising a temperature and time sufficient to cause evolution of nitrogenous gases from the mixture and form an aqueous solution having a red coloration. The resulting solution contains a highly soluble complex of iron which is believed to be present as a $\mu$-dihydroxo diferrate anion in complex association with a total of eight additional ligands, at least two of which are sulfato, halo or nitroso and the balance being aquo or hydroxo.

I have found that the aforementioned solution of iron can be readily formed from ferrous salts using only acidified nitrate solutions, preferably acidified ammonium nitrate as the reagent.

I have also found that the aforementioned solutions of iron are stable and can be blended with varied proportions of urea, ammonium nitrate, ammonium phosphate solutions or mixtures thereof.

I have also found that the aforementioned solutions of iron provide a source of iron that is readily available to plants and, in foliar applications, evidence a greater agronomical response than observed with either the water soluble iron salt or with conventional chelates of iron. The solutions are also free of the tendency to stain or spot foilage and crops which often occurs with solutions of iron salts or chelates.

The iron-containing solution is formed from an aqueous solution of ammonium nitrate having a limited pH value. When sulfate or halide anions are present, either introduced with the iron source or present in the ammonium nitrate solution, their concentration is maintained from about 0.25 to about 1.1, preferably from 0.5 to 1.0, equivalent weights per atomic weight of iron present in the solution. The pH is maintained from 1 to about 3, preferably from about 1.5 to 2.0, to limit the availability of hydroxyl ligands. The use of sulfate or halide anion concentrations in excess of the aforementioned ratio results in a decrease in solubility of the system by conversion of the soluble complex anion to a less soluble anion having two or more sulfato or halo ligands per atom of iron.

To prevent hydrolysis of the complex ion and formation of hydrated ferric oxide, it is preferred to prepare solutions that also contain highly solvated solutes such as ammonium nitrate, urea or ammonium phosphate which can be present in amounts from about 5 to 70, preferably from 20 to about 70 weight percent, or up to their limit of solubility at a satisfactory storage temperature such as 0° or 20° C. The aforementioned solvents are also plant nutrients so that the resulting solution is a highly effective source of iron and major nutrients. The resulting iron-containing solutions can also be blended with other fertilizer solutions such as urea, ammonium nitrate or ammonium phosphate.

When solutions that are concentrated in such solvated solutes are used, the aforementioned pH values should be measured on a diluted solution, e.g., on a 10:1 dilution of the solution with distilled water to avoid erroneous determinations of pH which result from the high solute concentration.

The extraction of the aqueous solutions with an organic solvent results in the precipitation of a novel ammonium, alkali metal or alkaline earth metal salt of a diferrate anion. Such extraction of a solution prepared from ferrous sulfate and ammonium nitrate has yielded the ammonium salt of a diferrate anion having the following empirical composition:

(I)

When the solution or the aforementioned salt is heated at a temperature from about 90° to about 195° C. at atmospheric pressure, the ammonium, alkali metal or alkaline earth metal salt of a diferrate anion having the following empirical formula can be recovered:

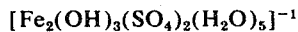

(II)

A similar extraction and crystallization on an aqueous solution prepared from metallic iron and ammonium nitrate which is admixed with a large excess of a soluble cesium salt results in precipitation of the cesium salt of a diferrate anion of analogous, but sulfate-free salt. The aforementioned solids have been characterized by elemental analysis and infrared and ultraviolet spectroscopy to reveal that the iron is present as a diferrate complex with two bridging hydroxo groups and with the nitrato sulfato and aquo ligands occupying the remaining coordination sites on the iron. It is believed that the bridging hydroxo ligands remain between iron atoms in solution, however, some interchange of the other ligands can occur, particularly when the salts are dissolved in a solution of ammonium orthophosphate. In such instances, it is believed that an orthophosphato ligand or a nitroso ligand can displace an aquo or sulfato ligand.

These salts are similar in empirical formula to materials that have been prepared by other methods, e.g., potassium ferric dihydrodisulfate identified as $H_2K_2[Fe(OH)_2(SO_4)_4 \cdot 6H_2O$ as well as jarosite and ammoniojarosite described on pages 341–344 of Vol. XIV of a *Comprehensive Treatise on Inorganic and Theoretical Chemistry* by Mellor. The novel iron complexes prepared in accordance with this invention, however, have substantially different physical properties and characteristics from those described by prior investigators and, in particular, the salts of this invention have substantially greater solubility. Because of the prior investigators' falure to control the pH of the solutions and to limit the availability of the sulfate or halide anion in their preparation, the compositions obtained by this invention are not attainable in the prior art preparations.

Aqueous solutions of the ammonium, alkali metal and alkaline earth metal salts of the soluble anion of complexed iron or aqueous solutions of such compound, together with ammonium plant nutrients such as urea, ammonium nitrate or ammonium phosphate can be applied to any crop exhibiting a deficiency of iron. These solutions can contain from 5 to about 70 weight percent, preferably from 5 to about 35 weight percent of urea, ammonium phosphate, ammonium nitrate, or mixtures thereof. Typically, ammonium nitrate may be admixed with ammonium phosphate or urea in 10:1 to 1:10 weight ratios, preferably 3:1 to 1:3 weight ratios. The detection of iron deficiencies is, of course, within the skill of the art. Briefly, however, such deficiency causes abnormal growth patterns such as stunting of the plant and yellowing (chlorosis) of its foliage. These solutions can be blended in varied proportions to provide a gambit of solutions with varied iron, nitrogen and/or phosphorus contents. Typically, the solutions can contain from 5 to 35, preferably from 8 to 15 weight percent nitrogen from ammonia, urea or nitrate; from 1 to 60, preferably from 4 to 10, weight percent phosphorus from orthophosphate or pyrophosphate; and from 0.05 to 15; preferably from 6 to 10 weight percent iron in the solution.

The iron solution can also contain soluble salts of other trace metals such as soluble salts of manganese, zinc, molybdenum, magnesium, copper, etc. The term "trace metal" is used herein in its agronomical sense as defining the metallic elements which have been found necessary in minute or trace quantities for plant growth. Suitable water soluble salts are the sulfates, halides, e.g., chlorides or nitrates of these metals. These salts can be present in amounts sufficient to provide from 0.05 to about 10, preferably from 2 to about 8, weight percent of any of the aforementioned metals, alone or in admixture with any or all of the other, aforementioned metals. The resultant solutions can then be used to correct or prevent deficiencies in plants of iron and of any of the aforementioned metals.

The solutions of this invention can be applied to cure iron deficiencies, alone or in combination with other trace metal deficiencies, or, preferably, can be applied on a regular basis to prevent the occurrence of the deficiencies. The solutions have universal applicability to any crop. Among various crops are included corn, wheat, oats, barley, alfalfa, clover, milo, sugar cane, buckwheat, cotton, peas, soybeans, peanuts, potatoes, turnips, all varieties of beans, celery, citrus such as grapefruit, lemons, limes, avocados, oranges, tangelos, tangerines, kumquats, pears, cherries, cantaloupe, casabas, crenshaws, strawberries, honeydew melons, muksmelons, Persian melons, watermelons, radishes, onions, garlic, leeks, shallots, broccoli, cabbage, lettuce, watercress, walnuts, macadamia, almonds, pecans, apples, pineapple, guava, blueberries, currants, blackberriers, grapes, etc.

Of the preceding, the solutions have the greatest applicability for fertilization of pineapple plants. These plants require almost exclusive foliar fertilization and require high dosages of nitrogen and iron. Use of the solutions of this invention permit application of both of these nutrients at high concentrations and dosages so that the total volume of foliar spray and/or the frequency of application can be reduced from the present practice.

The dosage of the solution depends considerably on the crop, however, the solutions can generally be sprayed on the foliage or to the soil surrounding any of the aforementioned crops at rates of from 2 to 250 gallons per acre, preferably from about 5 to 100, and most preferably from 7 to about 25 gallons per acre. Several and even monthly applications in a single growing season can be made, particularly on such crops that are highly sensitive to metal deficiencies such as pineapple. Application of the solutions to the plant foliage in the form of a spray is the preferred method for use. The sprays can be provided by use of conventional ground propelled or aerial equipment.

The source of the iron used in preparation of the solution can be widely varied and water soluble salts of iron or iron itself can be employed. The salts of strong inorganic acids such as sulfates, nitrates or halides and the $C_1$–$C_5$ alkanoic acids are usually water soluble and can be used as suitable sources of iron. Examples of sources of iron include ferric and ferrous salts such as ferric bromide, ferrous bromide, ferric chloride, ferrous fluoride, ferric iodide, ferrous acetate, ferrous propionate, ferric butyrate, ferric formate, ferrous sulfate, ferric sulfate, ferric nitrate, ferrous nitrate, ferrous ammonium sulfate, etc. Of the aforementioned, ferrous sulfate is by far the most abundant and readily available iron salt and it is therefore preferred to employ this material as the source of iron. In addition, the ferrous salts, such as ferrous sulfate, do not contain an excessive amount of anions such as sulfate which would limit the solubility of the anion. Ferric salts, if employed as a source of iron, should be employed in combination with a metallic iron source to lower the anion to elemental iron ratio to within the acceptable range for maximum solubility.

The ferrous salts are also preferred for their greater aqueous solubility which greatly facilitates their dissolution. Most of the ferric salts, other than the halides, have a limited water solubility which limits their rate of dissolution and rate of complex formation. Accordingly, ferrous salts or ferric halides are the preferred iron sources.

The iron is present in the solution as a soluble anionic iron complex. It can be present in an amount up to the limit of its solubility in the solution. The concentration can be from about 0.05 to about 20 weight percent; preferably from about 0.5 to 5 weight percent; expressed as iron in the solution.

The solutions are preferably prepared in an aqueous solution which also contains a highly solvated solute to limit the water activity and thereby prevent hydrolysis of the complex. Examples of such solvated solutes are ammonium nitrate and ammonium orthophosphate. These can be employed in concentrations from about 20 to about 70 weight percent and up to their limit of solubility at normal ambient conditions, e.g., from 20° to about 0° C.

A preferred medium for preparation of the solution of the iron complex is ammonium nitrate having a concentration from about 35 to about 60 weight percent, typically a "20-0-0" composition. This solution is acidified to a pH value from about 1 to about 3, as determined on a 10:1 dilution of an aliquot thereof, so as to stabilize the complex by limiting the avilability of hydroxyl ligands in the solution. Acidification can be accomplished by the addition of from 0.1 to about 10.0 weight percent of a strong mineral acid such as nitric acid, hydrochloric acid, sulfuric acid, perchloric acid, fluoric acid, phosphoric acid, etc., to achieve the aforementioned pH value. Again, as with selection of the iron source, care should be taken not to exceed the aforementioned anion to iron molar ratio of about 1.1 or maximum solubility of the iron will not be attained. It has been found that the sulfato diferrate complex formulas, (I) or (II), is prepared using ferrous sulfate and a solution of nitric acid-ammonium nitrate or using metallic iron and a solution of sulfuric acid-ammonium nitrate, provided that the pH values and sulfate to iron ratios are maintained as set forth herein.

Acifified ammonium nitrate solutions are used as the medium for preparation of the final solution. The ammonium nitrate serves as an oxidizing agent to oxidize the iron from the metallic or ferrous state to the ferric state with the release of an equivalent amount of nitorgen oxide or nitrogen. This reaction can be performed by admixing the iron or ferrous salt, e.g., ferrous sulfate, with the acidified ammonium nitrate solution having a pH from about 1.0 to about 3 and exposing the resulting admixture to autooxidation conditions of time and temperature sufficient to cause evolution of the aforementioned nitrogenous gases. This oxidation also imparts to the resulting solution a red coloration, characteristic of a $\mu$-dihydroxo diferrate structure with a strong light absorption in the wave length of about 335 millimicrons.

The time and temperature for this oxidation are, of course, inversely dependent, suitable temperatures being from about 40° to about 300° F. and times from a few seconds to several days. When the solution is warmed to a temperature between about 100° and 250° F., the oxidation commences immediately. In this preparation, when using an iron sulfate source or sulfuric acid, heating of the solution to a temperature of about 350° F. or higher should be avoided because of the danger of decomposition of the complex and resultant precipitation of the less soluble salt of the monovalent anion, $[Fe_2(SO_4)_2(OH)_3(H_2O)_5]^{-1}$. In the preparation of the iron complex by this oxidation reaction, it is preferred to employ either an excess of nitric acid in the ammonium nitrate solution or to employ superatmospheric pressure to prevent volatilization and loss of the nitrogen oxides from the acidified nitrate solution. Superatmospheric pressures from about 2 to about 1,000 atmospheres can be employed in this step with partial pressures of nitrogen oxide from 10 to 100 percent of the indicated total pressure.

The following will exemplify various compositions which can be provided in accordance with my invention:

| Ingredient | Weight Percent |
|---|---|
| Solution 1: | |
| Ammonium nitrate | 65.0 |
| Ammonium sulfatohydroxodiferrate | 18.0 |
| Solution 2: | |
| Ammonium nitrate | 75.0 |
| Nitric acid | 5.0 |
| Ammonium sulfatohydroxodiferrate | 1.0 |
| Solution 3: | |
| Ammonium nitrate | 30.0 |
| Nitric acid | 3.0 |
| Ammonium sulfatohydroxodiferrate | 5.0 |
| Ammonium phosphate | 15.0 |
| Solution 4: | |
| Ammonium nitrate | 27.5 |
| Potassium sulfatohydroxodiferrate | 7.0 |
| Potassium chloride | 18.0 |
| Solution 5: | |
| Ammonium nitrate | 15.0 |
| Nitric acid | 5.0 |
| Ammonium sulfatohydroxodiferrate | 4.7 |
| Mixture of mono- and di-ammonium orthophosphate, $(NH_4)_{1.7}H_{1.3}PO_4$ | 18.0 |
| Solution 6: | |
| Ammonium nitrate | 25.0 |
| Sodium sulfatohydroxodiferrate | 5.0 |
| Ammonium orthophosphate | 35.0 |
| Solution 7: | |
| Ammonium orthophosphate (8-24-0) | 65.0 |
| Ammonium sulfatohydroxodiferrate | 6.5 |
| Solution 8: | |
| Potassium nitrate | 22.0 |
| Potassium sulfatohydroxydiferrate | 7.2 |
| Solution 9: | |
| Lithium nitrate | 10.0 |
| Lithium sulfatohydroxodiferrate | 3.5 |
| Solution 10: | |
| Ammonium nitrate | 45.0 |
| Ammonium sulfatohydroxodiferrate | 5.5 |
| Solution 11: | |
| Ammonium nitrate | 50.0 |
| Potassium sulfatohydroxodiferrate | 8.0 |
| Solution 12: | |
| Ammonium nitrate | 57.0 |
| Ammonium sulfatohydroxodiferrate | 3.5 |
| Solution 13: | |

| | |
|---|---|
| Potassium nitrate | 48.0 |
| Potassium sulfatohydroxodiferrate | 8.5 |

The following will exemplify various compositions which can be prepared having other plant nutrients and salts of trace metals:

Solution 14:
| Ingredient | Weight Percent |
|---|---|
| Water | 52.2 |
| Sulfuric acid, 96% $H_2SO_4$ | 6.1 |
| Potassium sulfate | 8.4 |
| Magnesium sulfate, as heptahydrate | 2.5 |
| Zinc sulfate, as heptahydrate | 0.3 |
| Urea | 23.6 |
| Iron complex solution | 6.9 |

Solution 15:
| | |
|---|---|
| Water | 26.8 |
| Sulfuric acid, 96% $H_2SO_4$ | 5.7 |
| Potassium sulfate | 7.9 |
| Magnesium sulfate, as heptahydrate | 2.4 |
| Zinc sulfate, as heptahydrate | 0.2 |
| Ammonium nitrate solution, 57% $NH_4NO_3$ | 50.5 |
| Iron complex solution | 6.5 |

Solution 16:
| | |
|---|---|
| Water | 61.7 |
| Sulfuric acid, 96% $H_2SO_4$ | 7.2 |
| Potassium sulfate | 10.0 |
| Magnesium sulfate, as heptahydrate | 3.0 |
| Zinc sulfate, as heptahydrate | 0.3 |
| Urea | 9.6 |
| Iron complex solution | 8.2 |

Solution 17:
| | |
|---|---|
| Water | 50.6 |
| Sulfuric acid, 96% $H_2SO_4$ | 7.0 |
| Potassium sulfate | 9.7 |
| Magnesium sulfate, as heptahydrate | 2.9 |
| Zinc sulfate, as heptahydrate | 0.3 |
| Ammonium nitrate solution, 57% $NH_4NO_3$ | 21.5 |
| Iron complex solution | 8.0 |

Solution 18:
| | |
|---|---|
| Water | 59.0 |
| Sulfuric acid, 96% $H_2SO_4$ | 6.3 |
| Potassium sulfate | 9.6 |
| Magnesium sulfate, as heptahydrate | 1.4 |
| Zinc sulfate, as heptahydrate | 0.1 |
| Urea | 19.7 |
| Iron complex solution | 4.0 |

Solution 19:
| | |
|---|---|
| Water | 37.2 |
| Sulfuric acid, 96% $H_2SO_4$ | 5.9 |
| Potassium sulfate | 9.1 |
| Magnesium sulfate, as heptahydrate | 1.4 |
| Zinc sulfate, as heptahydrate | 0.1 |
| Ammonium nitrate solution, 57% $NH_4NO_3$ | 42.7 |
| Iron complex solution | 3.7 |

In the preceding compositions, the iron complex solution has the following composition:

| Ingredient | Weight Percent |
|---|---|
| Water | 27.8 |
| Nitric acid | 4.6 |
| Ammonium nitrate | 30.8 |
| Ammonium sulfato $\mu$-dihydroxo diferrate | 36.8 |

The preparation of the solutions by the preferred use of ferrous sulfate is illustrated as follows:

EXAMPLE 1

A solution of the iron complex is prepared in ammonium nitrate by the addition of 63 parts by weight of an aqueous solution containing 57 weight percent ammonium nitrate to a stirred stainless steel vessel which is maintained at atmospheric pressure. To the solution is added about 1 part by weight concentrated nitric acid, sufficient to reduce the pH of the solution to about 3.5 and, then, 5 parts by weight of ferrous sulfate heptahydrate are introduced into the stirred vessel while maintaining the temperature at about 80° F. The contents are stirred for 2 hours and the temperature of the vessel contents is then raised to 145° F. at which time an additional quantity of nitric acid comprising 0.4 weight percent of the contents is added. Upon the addition of the nitric acid, a gas comprising about 98 percent nitrogen rapidly evolves and the temperature of the contents rises to approximately 180° F. by the exothermic heat of reaction. Approximately 10 minutes after the addition of the nitric acid, the reaction is complete and gas evolution ceases. The final solution is deep red and contains the iron complex anion. The pH of this solution, as determined on a 10:1 diluted aliquot, is from 1.5 to about 2.0.

Portions of the solution are admixed with varied amounts of an ammonium orthophosphate solution of the "8-24-0" composition. Throughout all proportions from about 20 volumes ammonium phosphate solution per volume ammonium nitrate-diferrate solution to 20 volumes ammonium nitrate-diferrate solution per volume ammonium nitrate, the solutions are stable and free of precipitation.

Using the aforedescribed procedure, compositions of the anionic ferric complex are prepared by admixing the following components:

TABLE 1

Weight Percent

| Composition | Components | | | Crystallization Temperature, °F. |
|---|---|---|---|---|
| | $FeSO_4 \cdot 7H_2O$ | $HNO_3$ | $NH_4NO_3$[b] | |
| 1 | 7.0 | 1.5 | 52.1 | 38° |
| 2 | 16.5 | 3.5 | 45.6 | 33° |
| 3 | 24.7 | 5.3 | 40.0 | 36° |
| 4 | 32.9 | 7.0 | 34.3 | 28° |
| 5 | 7 | 1.5 | 0[a] | 30° |
| 6 | 16.5 | 3.5 | 0[a] | 25° |
| 7 | 24.7 | 5.3 | 0[a] | 30° |
| 8 | 41.2 | 8.8 | 28.5 | 13° |
| 9 | 49.4 | 10.6 | 22.8 | 4.5° | a the complex is formed in dilute nitric acid.
b the concentration values are expressed as the solute weight percent, however, the solutions are prepared using a 57 weight percent aqueous solution of ammonium nitrate.

The preparation of the solutions is repeated using iron filings as a source of metal rather than the ferrous sulfate salt. In this preparation, the addition of the iron filings at 80° F. results in an evolution of gas with the oxidation of the iron filings to the anionic ferric complex.

The agronomical effect of the treatment of plants with the ferric complex is evaluated by the procedures set forth in the following examples:

EXAMPLE 2

The agronomical effect of the diferrate complex in ammonium nitrate is evaluated for fertilization of pineapple plants. In this experiment the test plot is fertilized by several solutions to evaluate the relative effectiveness of the foliar application of nitrate containing the soluble diferrate complex. The latter solution is prepared by the addition of 1.5 parts by weight concentrated nitric acid and 47.4 parts by weight ferrous sulfate heptahydrate to 457.5 parts by weight of an aqueous ammonium nitrate solution containing 57 weight percent ammonium nitrate. The ammonium nitrate and nitric acid are admixed and heated to about 125° F. and the ferrous sulfate is then slowly added while the temperature is maintained at 125° F.

For comparative purposes, a ferric chelate with ethylene-diaminetetraacetic acid is dissolved in an aqueous solution containing 57 percent ammonium nitrate in an amount to provide an equal iron concentration of 1.6 weight percent.

The aforedescribed solutions are applied to the test plots at a dosage rate of 15 gallons per acre. In other comparisons an aqueous solution of 57 weight percent ammoniun nitrate and an aqueous solution of ferrous sulfate heptahydrate are separately applied to a test plot to achieve treatment of the plot with equal amounts of iron and ammonium nitrate. In another comparison, the present commercial practice is duplicated by application of an aqueous solution of 7 weight percent urea with sufficient dissolved ferrous sulfate to obtain an application of one pound iron per acre.

The test materials are applied to contiguous, randomized plots containing 2 rows of pineapple plants per plot. The solutions are applied with a spray device that produces a constant rate of spray while the check plots are sprayed with an equal volume of water under identical conditions. The test plots are evaluated constantly after application of the solutions until maturity and it is observed that test plots treated with the ferric complex solution exhibit a more favorable response than the plots treated with the iron salt or iron chelate solutions. The more favorable response is evidenced by more hardy growth and lesser chlorosis than observed for both the untreated plots and those treated with the soluble iron salt and chelate solutions.

EXAMPLE 3

A solution of the anionic diferrate complex in ammonium nitrate prepared similarly to that of Example 1 is applied to a Bermuda lawn at a liquid volume dosage of 200 gallons per acre. The concentrations of ammonium nitrate and the iron salt or complex are varied to obtain repetitive applications of 0.5, 1 and 2 pounds nitrogen and 0.35, 0.7 and 1.4 pounds iron per 1,000 square feet. The solutions are sprayed onto the lawn and 4 hours after application 0.25 inch of water is sprinkled on the lawn and 24 hours after application 0.75 inch of water is applied. The treated areas are inspected 24 hours after application and the following results, expressed on a scale of 1 to 5 where 1 represents maximum greening, are achieved using iron complex solution in ammonium nitrate, an aqueous solution of ferrous sulfate, an aqueous solution of ammonium nitrate, and a mixture of uncomplexed ferrous sulfate in ammoniun nitrate:

| Treatment | Pounds per 1,000 sq. feet Nitrogen | Iron | Greening Rating |
|---|---|---|---|
| Ammonium nitrate-anionic diferrate complex (9.6 wt. % and 6.8 wt. % | 0.5,1,2 | 0.35,0.7,1.4 | 1 |
| Ferrous sulfate(20 wt.% Fe) | 0 | 0.35,0.7,1.4 | 4 |
| Ammonium nitrate (20-0-0) | 0.5,1,2 | 0.35,0.7,1.4 | 2 |
| Ferrous sulfate+ammonium nitrate | 0.5,1,2 | 0.35,0.7,1.4 | 2 |

The preceding data evidence that the diferrate complex in ammonium nitrate exhibits a greater greening effect than observed with the use of the aqueous solutions of the ferrous sulfate alone, ammonium nitrate alone, or the combination of the uncomplexed ferrous sulfate in ammonium nitrate.

It is also observed that all applications of iron resulted in an initial brown coloration of the lawn which increased in intensity with the increasing iron dosage. After several days, however, the brown stain disappeared and the only color variation is the deeper green color of the lawn area that has been treated with the ammonium nitrate-anionic diferrate complex.

EXAMPLE 4

An aqueous solution of the anionic diferrate complex and ammonium nitrate prepared as in Example 1 is applied to Algerian tangerine trees. The trees are sprayed with the iron containing solution at a concentration to give the equivalent of 1 grams iron per tree and, in another application, a dosage of 2 grams iron per tree. Samples of the foliage are taken at one and seven weeks after application, and are analyzed for iron content. The following results are obtained:

| Treatment | Leaf Iron Content (ppm) 1 week afer | 7 weeks after |
|---|---|---|
| 1. Untreated | 70 | 80 |
| 2. Ammonium nitrate with ammonium hydroxosulfato diferrate at 1 gram iron/tree | 155 | 140 |
| 3. Same at 2 grams iron/tree | 245 | 250 |

These data reveal that the solutions of the diferrate complex contain iron in a readily available form for plant tissue.

EXAMPLE 5

The application is repeated on Algerian tangerine trees with solutions that also contain zinc and manganese which are added to portions of the ammonium nitrate-diferrate complex solution employed in the preceding example as the sulfate salts in amounts sufficient to provide a 0.35 part by weight of these metals per 1.0 part by weight of iron. The solutions are diluted with 100 parts water per part of diferrate complex solution and are sprayed onto the foliage of the trees at dosages of 1.0 gram iron and 0.35 gram each of zinc and manganese per tree. A solution of ferrous sulfate in dilute nitric acid, sufficient to provide a pH value comparable to that of the diluted diferrate solution is also applied at dosage of 1.0 gram iron per tree.

| Treatment | Leaf analyses | | | | | |
|---|---|---|---|---|---|---|
| | One week | | | Six weeks | | |
| | Iron | Zinc | Mn | Iron | Zinc | Mn |
| 1. Untreated | 75 | 17 | 68 | 48 | 13 | 52 |
| 2. Diferrate complex | 200 | 17 | 72 | 150 | 13 | 58 |
| 3. Ferrous sulfate with nitric acid(pH 1.5-2.0) | 220 | 17 | 62 | 135 | 14 | 51 |
| 4. Diferrate complex with zinc sulfate | 190 | 38 | 65 | 175 | 45 | 54 |
| 5. Diferrate complex with manganese sulfate | 200 | 17 | 82 | 135 | 13 | 70 |
| 6. Diferrate complex with zinc and manganese sulfates | 180 | 27 | 76 | 140 | 39 | 68 |

The preceding data demonstrate that the iron complex of this invention can be readily combined with salts of other metals necessary for plant nutrition and result in a marked uptake of the metals in the plant. Although treatment with the acidified solution of ferrous sulfate also results in an increase in iron content, after six weeks the foliar iron content of leaves treated with this solution decline to less than that of the diferrate complex (Treatment 3 compared to Treatment 2).

EXAMPLE 6

Comparisons between various sources of iron complexes are made by the application to tangerine trees of a portion of the solution used in Example 4 which contained the diferrate complex of this invention, a conventional polyflavonoid iron complex and an ethylenediaminetetraacetic acid chelate of iron. The solutions are diluted to provide, per tree, a quart of aqueous spray containing 1.5 grams nitrogen and 1 gram iron. One week after application, the trees are inspected and foliage samples are taken for iron analyses. The analyses reveal that all treatments raised the foliar iron content to 150 parts per million. The fruit of the trees treated with the EDTA and the commerical polyflavonoid iron complex, however, were spotted with a brown stain while the fruit of the trees treated with the diferrate complex of this invention were free of spots and stains.

EXAMPLE 7

Field plots of a hybrid grain sorghum about 12 inches in height are treated with an ammonium nitrate solution of the diferrate complex as prepared in Example 1 and, in comparative experiments, solutions of equal concentrations of ammonium nitrate, of ethylenediaminetetraacetic acid iron chelate, of a polyflavonoid iron complex and of ferrous sulfate. Each plot comprises 13.7 row feet and each treatment is applied to four replicates. The solutions are applied at a dosage of 30 gallons per acre and guard rows of untreated grain are left between adjacent test rows. The plots are all irrigated and fertilized in the conventional manner. At maturity, head samples are collected in a randomized pattern from all the test plots and the averatge head weight and threshed grain weight per head is determined. The following table summarizes the results:

| Treatment | Head Weight | Grain Weight |
|---|---|---|
| Iron (diferrate) complex | 2.500 | 1.875 |
| Ammonium nitrate | 1.813 | 1.359 |
| EDTA Iron | 2.188 | 1.641 |
| Polyflavonoid Iron | 2.317 | 1.77 |
| $FeSO_4 \cdot 7H_2O$ | 2.563 | 1.873 |
| Check | 2.313 | 1.787 |

The preceding data evidence that the treatment with the iron complex of this invention resulted in increased growth and grain yield over all other sources of iron that were treated. The application of the ammonium nitrate solutions resulted in some burning of the young plants. This burning was detrimental to the yields obtained from the solution which did not contain any of the diferrate complex with a decrease of about 24 percent in grain wieght from that of the untreated check plots being observed. In contrast, the diferrate solution solution, which contained an equal concentration of ammonium nitrate retarded burning and the plots treated with this solution yielded about 5 percent more grain weight than the untreated check.

EXAMPLE 8

A solution of the iron complex in ammonium nitrate is placed in a 250 milliliter separatory funnel and an equal volume of acetone is added. A dark red, viscous liquid is formed as a lower layer. The upper, acetone layer is decanted and the remaining layer is admixed with about five times its volume of methanol. A large volume of dark red crystals form which are recovered by filtration and washed several times with methanol. A sample of the solid is analyzed by infrared spectroscopy to reveal the presence of coordinated water, bridging hydroxo ligands, more than one type of sulfato ligand and an ammonium cation. Elemental analyses reveals the presence of hydroxyl groups and that all the nitrogen is present as ammoniacal nitrogen. Visual light analysis reveals the presence of sulfato ligands and ultraviolet analysis reveals the presence of iron-hydroxo bonding. Based on the analyses, the compound is identified as:

$$(NH_4)_2[Fe_2(OH)_2(SO_4)_3(H_2O)_5]$$

When treatment is applied to a solution of the iron complex in sodium nitrate, the sodium salt of the iron complex anion is formed.

EXAMPLE 9

A sample of about 200 grams of the iron complex in ammonium nitrate is placed in an open beaker and heated on a steam bath until a yellow precipitate develops. The precipitate is filtered from the sample, washed and analyzed by elemental analysis, infrared spectroscopy, ultraviolet and visual light analyses to reveal that it is:

$$NH_4[Fe_2(OH)_3(SO_4)_2(H_2O)_5]$$

When the treatment is applied to a solution of the iron complex in potassium nitrate, the potassium salt of the iron complex anion is formed.

EXAMPLE 10

An entirely nitrate solution is prepared by dissolving metallic iron in an acidified ammonium nitrate solution. The solution is prepared in a three-necked round-bottom flask equipped with a mechanical stirrer and thermometer. An ice bath is prepared for temperature control. The flask is charged with 280.5 grams of an aqueous solution containing 57 weight percent ammonium nitrate, 165 grams of an aqueous solution containing 33 weight percent nitric acid, 33 grams iron filings and 21.5 grams distilled water.

The flask contents are heated to 95° F. and evolution of a red gas is observed. The temperature rise to 130° to 135° F. and is maintained at that temperature by cooling with the ice bath. Upon completion of the reaction, the flask contents are filtered and 5.8 grams of unreacted iron are separated. The filtrate is a clear solution, deep red in color.

The experiment is repeated with the exception that 186.5 grams of an aqueous solution of 37.3 weight percent nitric acid is used and no distilled water is added. All the nitric acid is added initially in the first experiment and, in a repeative experiment, is added, one-third initially with the balance added during the reaction. The flask contents are maintained at 175° F. in the first experiment and are maintained at 135°–140° F. in the repeative experiment. The unreacted iron is 9.6 grams and 10.9 grams, respectively, in the first and repeative experiments.

The presently contemplated best mode of practice has been illustrated by the preceding examples. It is not intended that this illustration be limiting of the invention but, instead, it is intended that all equivalents to the reagents and method steps disclosed herein or obvious therefrom be within the scope of the invention.

I claim:

1. An aqueous solution of ammonium nitrate and from 0.05 to 20 wieght percent iron, present as an ammonium salt of a $\mu$-dihydroxo diferrate anion containing nitorso, nitrato and aquo ligands, said lignads being characterized by the following infrared absorption peaks:

nitroso at 2,200 cm$^{-1}$ and 1,750 cm$^{-1}$;

aquo at 1,600 cm$^{-1}$; and nitrato at 1,375 cm$^{-1}$ and 820 cm$^{-1}$;

said solution being further characterized by a red coloration and having been prepared by the addition of metallic iron or ferrous nitrate to an ammonium nitrate solution having from 5 to about 70 weight percent ammonium nitrate and a pH from 1 to about 3 and exposure to autooxidation conditions comprising a temperature from 50° to 300° F. and a time sufficient to cause evolution of nitrogenous gases from said solution and to impart to said solution a red coloration.

2. The solution of claim 1 in combination with from 0.05 to 10 weight percent of a halide or nitrate of manganese, zinc, molybdenum, magnesium or copper.

3. The solution of claim 1 wherein said iron source is metallic iron.

4. The solution of claim 1 in combination with 1 to about 60 weight percent P$_2$O$_5$, present as ammonium orthophosphate.

5. The solution of claim 1 in combination with 5 to about 70 weight percent urea.

6. An aqueous solution of from 0.05 to 15 weight percent iron present as the ammonium or alkali metal salt of a $\mu$-dihydroxo diferrate anion of the following formula:

[Fe$_2$(OH)$_2$(SO$_4$)$_3$(H$_2$O)$_5$]$^{-2}$, or

[Fe$_2$(OH)$_3$(SO$_4$)$_2$(H$_2$O)$_5$]$^{-2}$ from 5 to about 35 weight percent nitrogen present as ammonium nitrate, ammonium phosphate or urea; and a sufficient quantity of an acid selected from the class consisting of nitric, phosphoric or hydrohalic to provide the pH of said solution between about 1 and 3.

7. The solution of claim 8 also containing from 1 to 60 weight percent P$_2$O$_5$ and wherein said nitrogen is present as a mixture of ammonium nitrate and phosphate.

8. The solution of claim 6 wherein said acid is nitric acid.

9. The solution of claim 8 wherein said ntirogen is present as ammonium nitrate.

10. The solution of claim 8 wherein said nitrogen is present as a mixture of urea and ammonium nitrate.

* * * * *